(12) United States Patent
Horiguchi

(10) Patent No.: US 11,764,371 B2
(45) Date of Patent: Sep. 19, 2023

(54) FUEL CELL SYSTEM

(71) Applicant: TOYOTA JIDOSHA KABUSHIKI KAISHA, Toyota (JP)

(72) Inventor: Dai Horiguchi, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 17/664,791

(22) Filed: May 24, 2022

(65) Prior Publication Data

US 2022/0384824 A1   Dec. 1, 2022

(30) Foreign Application Priority Data

May 28, 2021   (JP) ................... 2021-090001

(51) Int. Cl.
*H01M 8/04007* (2016.01)
*H01M 8/04858* (2016.01)
(Continued)

(52) U.S. Cl.
CPC ... *H01M 8/04074* (2013.01); *H01M 8/04701* (2013.01); *H01M 8/04873* (2013.01);
(Continued)

(58) Field of Classification Search
CPC ......... H01M 8/04074; H01M 8/04701; H01M 8/04873; H01M 8/04902; H01M 8/04126; H01M 8/04134; H01M 8/04141; H01M 8/04149; H01M 8/04156; H01M 8/04164; H01M 8/04171; H01M 8/04179; H01M 8/0432; H01M 8/04328; H01M 8/04335; H01M 8/04343; H01M 8/0435; H01M 8/04358; H01M 8/04492; H01M 8/045; H01M 8/04507; H01M 8/04514;
(Continued)

(56) References Cited

U.S. PATENT DOCUMENTS

| | | | | |
|---|---|---|---|---|
| 2006/0234092 A1* | 10/2006 | Thompson | ........ | H01M 8/04268 429/429 |
| 2013/0095402 A1 | 4/2013 | Furuyama et al. | | |
| 2015/0357659 A1* | 12/2015 | Okui | ................ | H01M 8/04664 429/432 |

FOREIGN PATENT DOCUMENTS

| | | |
|---|---|---|
| JP | 2006-179199 A | 7/2006 |
| JP | 2010-044908 A | 2/2010 |
| JP | 2013-101914 A | 5/2013 |

* cited by examiner

*Primary Examiner* — Matthew W Van Oudenaren
(74) *Attorney, Agent, or Firm* — Dickinson Wright, PLLC

(57) ABSTRACT

A fuel cell system wherein the fuel cell comprises an electrolyte membrane; wherein the electrolyte membrane is a perfluorosulfonic acid (PFSA) membrane; wherein the controller has a data group showing a correlation between the current of the fuel cell and the temperature of the fuel cell which is necessary to keep a moisture content of the electrolyte membrane at a predetermined moisture content threshold or more; and wherein, when the temperature and voltage of the fuel cell become a predetermined first temperature threshold or more and a predetermined voltage threshold or more, respectively, the controller conducts a temperature dropping time power generation mode in which power generation is conducted while controlling the current of the fuel cell with reference to the data group, until the temperature of the fuel cell becomes a predetermined second temperature threshold which is lower than the first temperature threshold.

2 Claims, 4 Drawing Sheets

(51) Int. Cl.
*H01M 8/04701* (2016.01)
*H01M 8/10* (2016.01)
*H01M 8/04828* (2016.01)

(52) U.S. Cl.
CPC ...... *H01M 8/04902* (2013.01); *H01M 8/0485* (2013.01); *H01M 8/0488* (2013.01); *H01M 8/0491* (2013.01); *H01M 8/04828* (2013.01); *H01M 2008/1095* (2013.01); *H01M 2250/20* (2013.01)

(58) Field of Classification Search
CPC ......... H01M 8/04522; H01M 8/04529; H01M 8/04552; H01M 8/04559; H01M 8/04582; H01M 8/04589; H01M 8/04708; H01M 8/04716; H01M 8/04723; H01M 8/04828; H01M 8/04835; H01M 8/04843; H01M 8/0485; H01M 8/0488; H01M 8/0491; H01M 2008/1095; H01M 2250/20
See application file for complete search history.

FUEL CELL SYSTEM

TECHNICAL FIELD

The disclosure relates to a fuel cell system.

BACKGROUND

A fuel cell (FC) is a power generation device which is composed of a single unit fuel cell (hereinafter, it may be referred to as "cell") or a fuel cell stack composed of stacked unit fuel cells (hereinafter, it may be referred to as "stack") and which generates electrical energy by electrochemical reaction between fuel gas (e.g., hydrogen) and oxidant gas (e.g., oxygen). In many cases, the fuel gas and oxidant gas actually supplied to the fuel cell, are mixtures with gases that do not contribute to oxidation and reduction. Especially, the oxidant gas is often air containing oxygen.

Hereinafter, fuel gas and oxidant gas may be collectively and simply referred to as "reaction gas" or "gas". Also, a single unit fuel cell and a fuel cell stack composed of stacked unit cells may be referred to as "fuel cell".

In general, the unit fuel cell includes a membrane electrode assembly (MEA).

The membrane electrode assembly has a structure such that a catalyst layer and a gas diffusion layer (or GDL, hereinafter it may be simply referred to as "diffusion layer") are sequentially formed on both surfaces of a solid polymer electrolyte membrane (hereinafter, it may be simply referred to as "electrolyte membrane"). Accordingly, the membrane electrode assembly may be referred to as "membrane electrode gas diffusion layer assembly" (MEGA).

As needed, the unit fuel cell includes two separators sandwiching both sides of the membrane electrode gas diffusion layer assembly. In general, the separators have a structure such that a groove is formed as a reaction gas flow path on a surface in contact with the gas diffusion layer. The separators have electronic conductivity and function as a collector of generated electricity.

In the fuel electrode (anode) of the fuel cell, hydrogen ($H_2$) as the fuel gas supplied from the gas flow path and the gas diffusion layer, is protonated by the catalytic action of the catalyst layer, and the protonated hydrogen goes to the oxidant electrode (cathode) through the electrolyte membrane. An electron is generated at the same time, and it passes through an external circuit, does work, and then goes to the cathode. Oxygen ($O_2$) as the oxidant gas supplied to the cathode reacts with protons and electrons in the catalyst layer of the cathode, thereby generating water. The generated water gives appropriate humidity to the electrolyte membrane, and excess water penetrates the gas diffusion layer and then is discharged to the outside of the system.

Various research has been conducted on a fuel cell system mounted and used in fuel cell electric vehicles (hereinafter may be referred to as "vehicle").

For example, Patent Literature 1 discloses a fuel cell system which controls deterioration of an electrolyte film.

Patent Literature 2 discloses a fuel cell system in which a humid state of an electrolyte film and a catalyst layer is maintained, in which a dry and wet history is inhibited to be added to the electrolyte film and the catalyst layer, in which deterioration of the electrolyte film and the catalyst layer is little and which is high in durability when a cell voltage is higher than a prescribed one.

Patent Literature 3 discloses a fuel cell system which can reliably detect concentration of hydrogen peroxide in real time, thereby effectively suppressing deterioration in an electrolyte membrane or the like and capable of controlling the operation of a fuel cell at a favorable condition.

Patent Literature 1: Japanese Patent Application Laid-Open (JP-A) No. 2010-044908
Patent Literature 2: JP-A No. 2006-179199
Patent Literature 3: JP-A No. 2013-101914

An electrolyte membrane is an essential component of a fuel cell, and it has a controlling influence on the lifetime of the fuel cell. A fuel cell using a hydrocarbon-based electrolyte membrane has the following problem: when the amount of generated water is small, generated hydrogen peroxide and radicals are concentrated and results in deterioration of the electrolyte membrane.

In Patent Literature 1, the amount of water generated in the previous 8 minutes is always monitored, and the minimum amount of power generated in next 10 minutes is determined. Accordingly, the fuel cell often generates power at the time when power generation is not needed (such as the time when a vehicle is stopped (e.g., idling) and the time when a vehicle is driven at very low speed at which FC power generation is rarely requested). At the time when power generation is not needed, the temperature of the fuel cell is low, and the low-temperature fuel cell is not appropriate as a control to prevent the deterioration of the electrolyte membrane, which remarkably speeds up at high temperature, and a decrease in fuel efficiency is caused.

Also in Patent Literature 1, the minimum amount of power generated in next 10 minutes is determined based on the amount of water generated in the previous 8 minutes. Accordingly, a large amount of water is generated during, for example, high-load continuous operation in which the fuel cell temperature tends to be high (such as continuous uphill driving). Accordingly, just after the completion of the high-load operation, a control to suppress the deterioration of the electrolyte membrane cannot be exerted by the technique disclosed in Patent Literature 1.

That is, there is a possibility that it is difficult for the technique disclosed in Patent Literature 1 to suppress the deterioration of the electrolyte membrane in a fuel cell power generation condition of high temperature, low load and low humidity, under which the electrolyte membrane is remarkably deteriorated.

SUMMARY

The present disclosure were achieved in light of the above circumstances. An object of the present disclosure is to provide a fuel cell system configured to suppress the deterioration of an electrolyte membrane.

The fuel cell system of the present disclosure is a fuel cell system,
wherein the fuel cell system comprises:
a fuel cell,
a cooling system configured to cool down the fuel cell,
a voltage acquirer configured to acquire a voltage of the fuel cell,
a current acquirer configured to acquire a current of the fuel cell,
a temperature acquirer configured to acquire a temperature of the fuel cell, and
a controller;
wherein the fuel cell comprises an electrolyte membrane;
wherein the electrolyte membrane is a perfluorosulfonic acid (PFSA) membrane;
wherein the controller has a data group showing a correlation between the current of the fuel cell and the temperature of the fuel cell which is necessary to keep a moisture content of the electrolyte membrane at a predetermined moisture content threshold or more; and wherein, when the temperature and voltage of the fuel cell become a predetermined first temperature threshold or more and a predetermined voltage threshold or more, respectively, the controller conducts a temperature dropping time power generation mode in which power generation is conducted while controlling the current of the fuel cell with reference to the data group, until the temperature of the fuel cell becomes a predetermined second temperature threshold which is lower than the first temperature threshold.

In the fuel cell system of the disclosed embodiments, the fuel cell system may further comprise a battery and a state of charge (SOC) acquirer configured to acquire the SOC of the battery, and when the temperature dropping time power generation mode is executed and when the SOC of the battery is less than a predetermined SOC threshold, the controller may charge the battery by the power of the fuel cell until the SOC of the battery becomes the SOC threshold or more.

According to the fuel cell system of the present disclosure, the deterioration of the electrolyte membrane is suppressed.

BRIEF DESCRIPTION OF THE DRAWINGS

In the accompanying drawings,

FIG. 3 is a diagram of an example of the result of confirming a voltage recovery rate with respect to a humidification time when humidified gas (80% RH (relative humidity), 80° C.) is supplied from the outside to the fuel cell in a dry state;

FIG. 4 is a diagram of an example of the power generation map (the data group) showing the correlation between the current of the fuel cell and the temperature of the fuel cell when the temperature of the fuel cell in a high temperature state drops, which is necessary to keep the moisture content of the electrolyte membrane at the predetermined moisture content threshold or more, which is effective in suppressing the deterioration of the electrolyte membrane;

FIG. 5 is a diagram of an example of the transition of the temperature and the current during the temperature dropping time power generation mode of the present disclosure, in light of the power generation map shown in FIG. 4;

FIG. 6 is a diagram of an example of the transition of the temperature and the current when the temperature dropping time power generation mode of the present disclosure is not executed, in light of the power generation map shown in FIG. 4.

DETAILED DESCRIPTION

The fuel cell system of the present disclosure is a fuel cell system, wherein the fuel cell system comprises:
a fuel cell,
a cooling system configured to cool down the fuel cell,
a voltage acquirer configured to acquire a voltage of the fuel cell,
a current acquirer configured to acquire a current of the fuel cell,
a temperature acquirer configured to acquire a temperature of the fuel cell, and
a controller;
wherein the fuel cell comprises an electrolyte membrane;
wherein the electrolyte membrane is a perfluorosulfonic acid (PFSA) membrane;
wherein the controller has a data group showing a correlation between the current of the fuel cell and the temperature of the fuel cell which is necessary to keep a moisture content of the electrolyte membrane at a predetermined moisture content threshold or more; and
wherein, when the temperature and voltage of the fuel cell become a predetermined first temperature threshold or more and a predetermined voltage threshold or more, respectively, the controller conducts a temperature dropping time power generation mode in which power generation is conducted while controlling the current of the fuel cell with reference to the data group, until the temperature of the fuel cell becomes a predetermined second temperature threshold which is lower than the first temperature threshold.

The temperature of a fuel cell is increased when the fuel cell is kept in a high-load (high-current density) state by continuous uphill driving, for example. In this state, if the load is decreased by, for example, downhill driving just after the uphill driving, the amount of water generated by the power generation of the fuel cell decreases, resulting in the loss of the effect of wetting the fuel cell by the generated water. Accordingly, until the temperature of the fuel cell is decreased to the specified temperature, the fuel cell is kept in a high-temperature, low-load (high-voltage) and low-humidity state which speeds up the deterioration of the electrolyte membrane.

Figure 1:
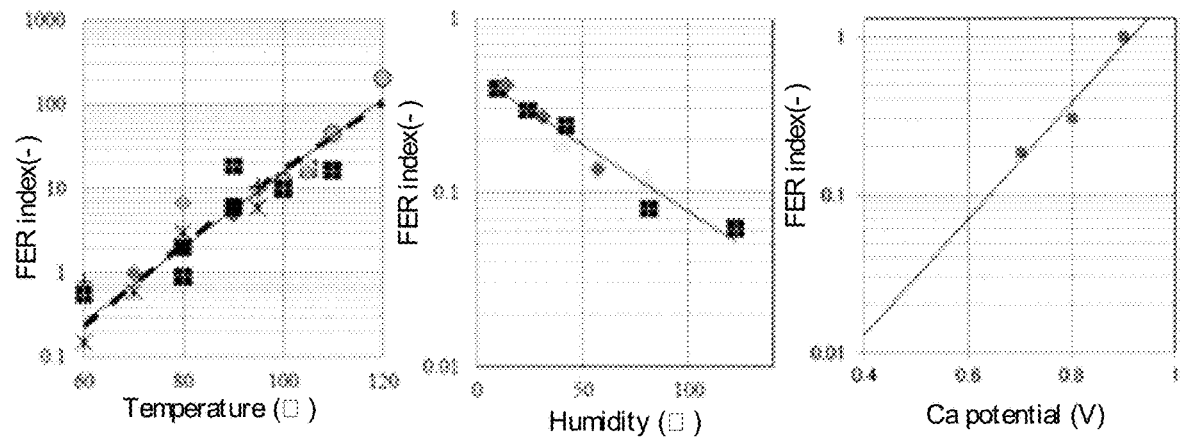
FIG. 1 shows the FER index of the electrolyte membrane with respect to the temperature of the electrolyte membrane (the left graph), the FER index of the electrolyte membrane with respect to the humidity of the electrolyte membrane (the middle graph), and the FER index of the electrolyte membrane with respect to the cathode (Ca) potential of the fuel cell (the right graph)

FIG. 1 shows the FER index of the electrolyte membrane with respect to the temperature of the electrolyte membrane (the left graph), the FER index of the electrolyte membrane with respect to the humidity of the electrolyte membrane (the middle graph), and the FER index of the electrolyte membrane with respect to the cathode (Ca) potential of the fuel cell (the right graph).

The electrolyte membrane (perfluorosulfonic acid membrane (PFSA membrane)) used in the fuel cell has the properties shown in FIG. 1.

The FER index on the vertical axis of FIG. 1 is an index value according to a fluorine emission rate. As the value increases, more fluorine (a deterioration product of the electrolyte membrane) is emitted. That is, it means that the deterioration of the electrolyte membrane progresses.

As shown in FIG. 1, the electrolyte membrane has the following properties: the deterioration of the electrolyte membrane speeds up as the temperature increases; the deterioration of the electrolyte membrane speeds up as the humidity decreases; and the deterioration of the electrolyte membrane speeds up as the potential increases.

In the method for operating the fuel cell (such as the driving condition of a fuel cell electric vehicle), the following condition is expected.

Figure 2:
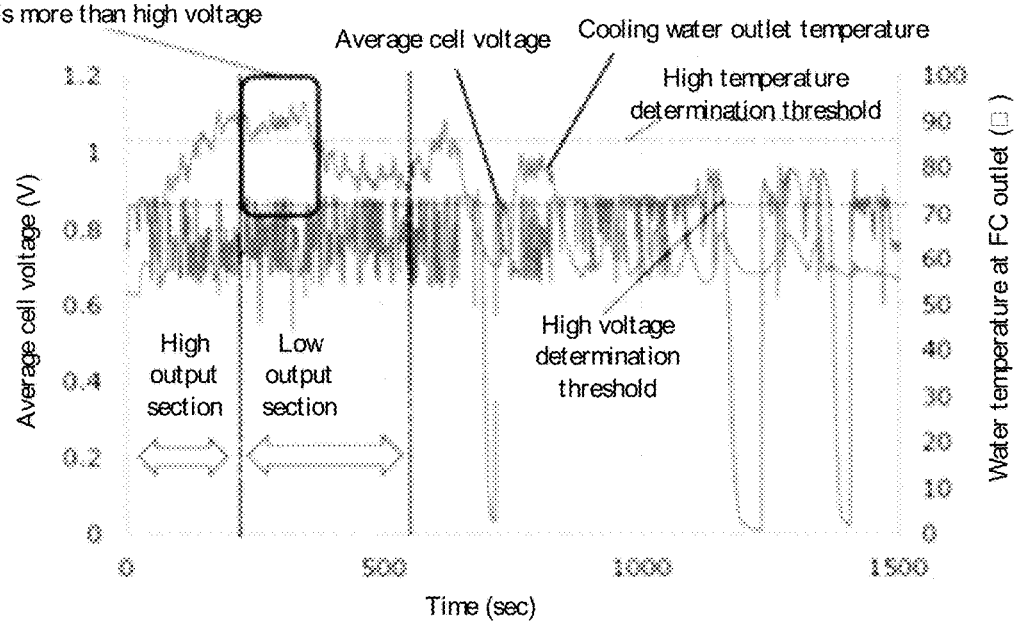
FIG. 2 is a diagram of an example of the transition of the cell voltage and the transition of the temperature of the cooling water outlet of the fuel cell during the operation of the fuel cell.

FIG. 2 is a diagram of an example of the transition of the cell voltage and the transition of the temperature of the cooling water outlet of the fuel cell during the operation of the fuel cell.

For example, if a large load is applied to the fuel cell mounted in a vehicle and there is a state such that a small or no load is applied to the fuel cell just after uphill driving of the vehicle by which the temperature of the fuel cell is increased, the fuel cell is kept in a high-temperature and high-potential (i.e., low-humidity) state until the temperature of the fuel cell decreases to the specified value, and the deterioration of the electrolyte membrane speeds up.

To suppress the deterioration of the electrolyte membrane, in addition to the fuel cell, a humidifying means can be disposed as an external device as in the prior-art.

Wetting by the external humidification is less effective, however, and the deterioration of the electrolyte membrane cannot be sufficiently suppressed. Also in the case of wetting the electrolyte membrane by using humidified gas as the humidifying means, the humidified gas highly humidifies the gas diffusion layer, the catalyst layer and the electrolyte membrane in sequence. In many cases, the gas diffusion layer and the catalyst layer have water repellency to prevent clogging of generated water. More specifically, since the humidified gas supplied from the outside is blocked by these layers, it takes a long time to wet the electrolyte membrane. Accordingly, the deterioration of the electrolyte membrane speeds up during the time to create the wet state.

Figures 3, 4:
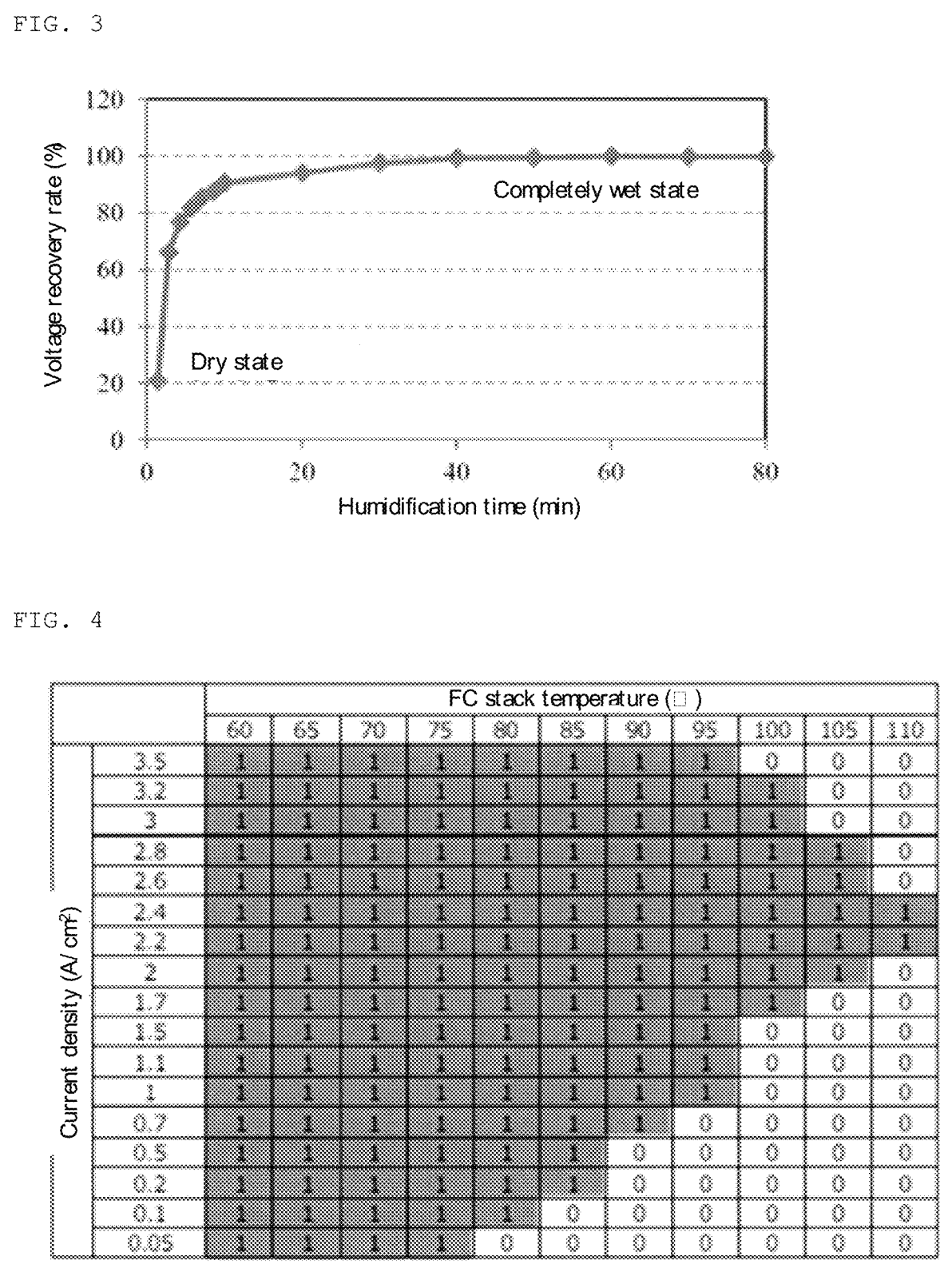

FIG. 3 is a diagram of an example of the result of confirming a voltage recovery rate with respect to an external humidification time when humidified gas (80% RH (relative humidity), 80° C.) is supplied from the outside to the fuel cell in a dry state.

As is clear from FIG. 3, it takes a long time to wet the electrolyte membrane when humidified gas (80% RH (relative humidity), 80° C.) is supplied from the outside to the fuel cell in a dry state.

According to the present disclosure, when the fuel cell falls into a power generation condition of high temperature (a temperature equal to or more than the predetermined temperature threshold), low load and low humidity, the temperature of the fuel cell is decreased while the power generation amount of the fuel cell is controlled to generate desired liquid water so that the minimum moisture content (humidity) of the electrolyte membrane can be kept at the predetermined moisture content threshold or more until the temperature of the fuel cell falls below the specified operation temperature.

According to the present disclosure, the deterioration of the electrolyte membrane is suppressed by controlling power generation while avoiding the power generation condition of high temperature, low load and low humidity, under which the electrolyte membrane is remarkably deteriorated. In addition, the fuel efficiency is enhanced by using the power of the fuel cell under control for charging the battery.

The fuel cell system of the present disclosure includes the fuel cell, the cooling system, the voltage acquirer, the current acquirer, the temperature acquirer and the controller.

In general, the fuel cell system of the present disclosure is mounted and used in a vehicle including a motor as a driving source.

The fuel cell system of the present disclosure may be mounted and used in a vehicle that can be run by the power of a secondary cell.

The vehicle may be a fuel cell electric vehicle.

The vehicle may include the fuel cell system of the present disclosure.

The motor is not particularly limited, and it may be a conventionally-known driving motor.

The fuel cell system of the present disclosure includes the fuel cell.

The fuel cell may be a fuel cell composed of only one unit fuel cell, or it may be a fuel cell stack composed of stacked unit fuel cells.

The number of the stacked unit fuel cells is not particularly limited. For example, 2 to several hundred unit fuel cells may be stacked, or 2 to 600 unit fuel cells may be stacked.

The fuel cell stack may include an end plate at both stacking-direction ends of each unit fuel cell.

Each unit fuel cell includes at least the electrolyte membrane. In general, it includes a membrane electrode gas diffusion layer assembly.

The membrane electrode gas diffusion layer assembly includes an anode-side gas diffusion layer, an anode catalyst layer, an electrolyte membrane, a cathode catalyst layer, and a cathode-side gas diffusion layer in this order.

The cathode (oxidant electrode) includes the cathode catalyst layer and the cathode-side gas diffusion layer.

The anode (fuel electrode) includes the anode catalyst layer and the anode-side gas diffusion layer.

The cathode catalyst layer and the anode catalyst layer are collectively referred to as "catalyst layer".

The catalyst layer may contain a catalyst metal for accelerating an electrochemical reaction, a proton-conducting electrolyte, and an electron-conducting carrier, for example.

As the catalyst metal, for example, platinum (Pt) or an alloy of Pt and another metal (such as Pt alloy mixed with cobalt, nickel or the like) may be used.

The electrolyte may be fluorine resin or the like. As the fluorine resin, for example, a Nafion solution may be used.

The catalyst metal is supported on the carrier. In each catalyst layer, the carrier supporting the catalyst metal (i.e., catalyst supporting carrier) and the electrolyte may be mixed.

As the carrier for supporting the catalyst metal, examples include, but are not limited to, a commercially-available carbonaceous material such as carbon.

The cathode-side gas diffusion layer and the anode-side gas diffusion layer are collectively referred to as "gas diffusion layer".

The gas diffusion layer may be a gas-permeable electroconductive member or the like.

As the electroconductive member, examples include, but are not limited to, a porous carbon material such as carbon cloth and carbon paper, and a porous metal material such as metal mesh and foam metal.

The electrolyte membrane may be the perfluorosulfonic acid (PFSA) membrane.

The electrolyte membrane may be a Nafion membrane (manufactured by DuPont Co., Ltd.), for example.

As needed, each unit fuel cell may include two separators sandwiching both sides of the membrane electrode gas diffusion layer assembly. One of the two separators is an anode-side separator, and the other is a cathode-side separator. In the present disclosure, the anode-side separator and the cathode-side separator are collectively referred to as "separator".

The separator may include supply and discharge holes for allowing a fluid such as a reaction gas and a refrigerant to flow in the stacking direction of the unit fuel cells. As the refrigerant, for example, a mixed solution of ethylene glycol and water may be used to prevent freezing at low temperature.

As the supply hole, examples include, but are not limited to, a fuel gas supply hole, an oxidant gas supply hole, and a refrigerant supply hole.

As the discharge hole, examples include, but are not limited to, a fuel gas discharge hole, an oxidant gas discharge hole, and a refrigerant discharge hole.

The separator may include one or more fuel gas supply holes, one or more oxidant gas supply holes, one or more refrigerant supply holes, one or more fuel gas discharge holes, one or more oxidant gas discharge holes, and one or more refrigerant discharge holes.

The separator may include a reaction gas flow path on a surface in contact with the gas diffusion layer. Also, the separator may include a refrigerant flow path for keeping the temperature of the fuel cell constant, on the surface opposite to the surface in contact with the gas diffusion layer.

When the separator is the anode-side separator, it may include one or more fuel gas supply holes, one or more oxidant gas supply holes, one or more refrigerant supply holes, one or more fuel gas discharge holes, one or more oxidant gas discharge holes, and one or more refrigerant discharge holes. The anode-side separator may include a fuel gas flow path for allowing the fuel gas to flow from the fuel gas supply hole to the fuel gas discharge hole, on the surface in contact with the anode-side gas diffusion layer. The anode-side separator may include a refrigerant flow path for allowing the refrigerant to from the refrigerant supply hole to the refrigerant discharge hole, on the surface opposite to the surface in contact with the anode-side gas diffusion layer.

When the separator is the cathode-side separator, it may include one or more fuel gas supply holes, one or more oxidant gas supply holes, one or more refrigerant supply holes, one or more fuel gas discharge holes, one or more oxidant gas discharge holes, and one or more refrigerant discharge holes. The cathode-side separator may include an oxidant gas flow path for allowing the oxidant gas to flow from the oxidant gas supply hole to the oxidant gas discharge hole, on the surface in contact with the cathode-side gas diffusion layer. The cathode-side separator may include a refrigerant flow path for allowing the refrigerant to flow from the refrigerant supply hole to the refrigerant discharge hole, on the surface opposite to the surface in contact with the cathode-side gas diffusion layer.

The separator may be a gas-impermeable electroconductive member or the like. As the electroconductive member, examples include, but are not limited to, gas-impermeable dense carbon obtained by carbon densification, and a metal plate (such as an iron plate, an aluminum plate and a stainless-steel plate) obtained by press-molding. The separator may function as a collector.

The fuel cell stack may include a manifold such as an inlet manifold communicating between the supply holes and an outlet manifold communicating between the discharge holes.

As the inlet manifold, examples include, but are not limited to, an anode inlet manifold, a cathode inlet manifold and a refrigerant inlet manifold.

As the outlet manifold, examples include, but are not limited to, an anode outlet manifold, a cathode outlet manifold and a refrigerant outlet manifold.

In the present disclosure, the fuel gas and the oxidant gas are collectively referred to as "reaction gas". The reaction gas supplied to the anode is the fuel gas, and the reaction gas supplied to the cathode is the oxidant gas. The fuel gas is a gas mainly containing hydrogen, and it may be hydrogen. The oxidant gas may be oxygen, air, dry air or the like.

The voltage acquirer acquires the voltage of the fuel cell.

The voltage acquirer is electrically connected to the controller. The controller detects the voltage of the fuel cell acquired by the voltage acquirer.

As the voltage acquirer, a conventionally-known voltage sensor, a voltmeter or the like may be used.

The current acquirer acquires the current of the fuel cell. The current of the fuel cell may be a current density.

The current acquirer is electrically connected to the controller. The controller detects the current of the fuel cell acquired by the current acquirer.

As the current acquirer, a conventionally-known current sensor, a current meter or the like may be used.

The temperature acquirer acquires the temperature of the fuel cell.

The temperature of the fuel cell may be the temperature of the refrigerant flowing through the fuel cell. The temperature acquirer is electrically connected to the controller. The controller detects the temperature of the fuel cell acquired by the temperature acquirer.

As the temperature acquirer, a conventionally-known temperature sensor, a thermometer or the like may be used.

The cooling system cools down the fuel cell. The cooling system may include a refrigerant supplier and a refrigerant circulation flow path.

The refrigerant circulation flow path communicates between the refrigerant supply and discharge holes provided in the fuel cell, and it allows the refrigerant supplied from the refrigerant supplier to be circulated inside and outside the fuel cell.

The refrigerant supplier is electrically connected to the controller. The refrigerant supplier is operated according to a control signal from the controller. The flow rate of the refrigerant supplied from the refrigerant supplier to the fuel cell, is controlled by the controller. The temperature of the fuel cell may be controlled thereby.

As the refrigerant supplier, examples include, but are not limited to, a cooling water pump.

The refrigerant circulation flow path may be provided with a radiator for heat dissipation from the cooling water.

The refrigerant circulation flow path may be provided with a reserve tank for storing the refrigerant.

The fuel cell system may include an oxidant gas system.

The oxidant gas system may include an oxidant gas supplier, an oxidant gas supply flow path, an oxidant off-gas discharge flow path, an oxidant gas bypass flow path, a bypass valve, an oxidant gas flow rate sensor and so on.

The oxidant gas supplier supplies the oxidant gas to the fuel cell. More specifically, the oxidant gas supplier supplies the oxidant gas to the cathode of the fuel cell.

As the oxidant gas supplier, for example, an air compressor may be used.

The oxidant gas supplier is electrically connected to the controller. The oxidant gas supplier is operated according to a control signal from the controller. At least one selected from the group consisting of the flow rate and pressure of the oxidant gas supplied from the oxidant gas supplier to the cathode, may be controlled by the controller.

The oxidant gas supply flow path connects the oxidant gas supplier and the oxidant gas inlet of the fuel cell. The oxidant gas supply flow path allows the oxidant gas to be supplied from the oxidant gas supplier to the cathode of the fuel cell. The oxidant gas inlet may be the oxidant gas supply hole, the cathode inlet manifold, or the like.

The oxidant off-gas discharge flow path is connected to the oxidant gas outlet of the fuel cell. The oxidant off-gas discharge flow path allows the oxidant off-gas, which is the oxidant gas discharged from the cathode of the fuel cell, to be discharged to the outside. The oxidant gas outlet may be the oxidant gas discharge hole, the cathode outlet manifold, or the like.

The oxidant off-gas discharge flow path may be provided with an oxidant gas pressure control valve.

The oxidant gas pressure control valve is electrically connected to the controller. By opening the oxidant gas pressure control valve by the controller, the oxidant off-gas, which is the reacted oxidant gas, is discharged to the outside from the oxidant off-gas discharge flow path. The pressure of the oxidant gas supplied to the cathode (cathode pressure) may be controlled by controlling the opening degree of the oxidant gas pressure control valve.

The oxidant gas bypass flow path branches from the oxidant gas supply flow path, bypasses the fuel cell, and connects the branch of the oxidant gas supply flow path and the junction of the oxidant off-gas discharge flow path.

The bypass valve is disposed in the oxidant gas bypass flow path.

The bypass valve is electrically connected to the controller. By opening the bypass valve by the controller, when the supply of the oxidant gas to the fuel cell is unnecessary, the oxidant gas can bypass the fuel cell and be discharged to the outside from the oxidant off-gas discharge flow path.

The oxidant gas flow rate sensor is disposed in the oxidant gas supply flow path.

The oxidant gas flow rate sensor detects the flow rate of the oxidant gas in the oxidant gas system. The oxidant gas flow rate sensor is electrically connected to the controller. The controller may estimate the rotational speed of the air compressor from the flow rate of the oxidant gas detected by the oxidant gas flow rate sensor. The oxidant gas flow rate sensor may be disposed upstream from the oxidant gas supplier of the oxidant gas supply flow path.

As the oxidant gas flow rate sensor, a conventionally-known flow meter or the like may be used.

The fuel cell system may include a fuel gas system.

The fuel gas system supplies fuel gas to the fuel cell.

The fuel gas system may include a fuel gas supplier, a fuel gas supply flow path, an ejector, a circulation flow path, a gas-liquid separator, a gas and water discharge valve, a fuel off-gas discharge flow path and so on.

The fuel gas supplier supplies the fuel gas to the anode of the fuel cell.

As the fuel gas supplier, examples include, but are not limited to, a fuel tank such as a liquid hydrogen tank and a compressed hydrogen tank.

The fuel gas supplier is electrically connected to the controller. In the fuel gas supplier, ON/OFF of the fuel gas supply to the fuel cell may be controlled by controlling the opening and closing of the main shutoff valve of the fuel gas supplier according to a control signal from the controller.

The fuel gas supply flow path connects the fuel gas supplier and the fuel gas inlet of the fuel cell. The fuel gas supply flow path allows the fuel gas to be supplied to the anode of the fuel cell. The fuel gas inlet may be the fuel gas supply hole, the anode inlet manifold, or the like.

In the fuel gas supply flow path, the ejector may be disposed.

For example, the ejector may be disposed at a junction with the circulation flow path on the fuel gas supply flow path. The ejector supplies a mixed gas containing fuel gas and circulation gas to the anode of the fuel cell. As the ejector, a conventionally-known ejector may be used.

A pressure control valve and a medium-pressure hydrogen sensor may be disposed in a region between the fuel gas supplier and ejector of the fuel gas supply flow path.

The pressure control valve controls the pressure of the fuel gas supplied from the fuel gas supplier to the ejector.

The pressure control valve is electrically connected to the controller. The pressure of the fuel gas supplied to the ejector may be controlled by controlling the opening/closing, opening degree or the like of the pressure control valve by the controller.

The medium-pressure hydrogen sensor is electrically connected to the controller. The controller detects the fuel gas pressure measured by the medium-pressure hydrogen sensor. The pressure of the fuel gas supplied to the ejector may be controlled by controlling the opening/closing, opening degree or the like of the pressure control valve, based on the detected pressure.

The fuel off-gas discharge flow path connects the fuel gas outlet of the fuel cell and the outside of the fuel cell system.

In the fuel off-gas discharge flow path, a gas-liquid separator may be disposed in a region between the fuel gas outlet and the outside of the fuel cell system.

The fuel off-gas discharge flow path may branch from the circulation flow path through the gas-liquid separator.

The fuel off-gas discharge flow path discharges, to the outside of the fuel cell system, the fuel off-gas discharged from the fuel gas outlet of the fuel cell. The fuel gas outlet may be the fuel gas discharge hole, the anode outlet manifold, or the like.

The gas and water discharge valve (the fuel off-gas discharge valve) may be disposed in the fuel off-gas discharge flow path. The gas and water discharge valve is disposed downstream from the gas-liquid separator in the fuel off-gas discharge flow path.

The gas and water discharge valve allows the fuel off-gas, water and the like to be discharged to the outside (of the system). The outside may be the outside of the fuel cell system, or it may be the outside of the vehicle.

The gas and water discharge valve may be electrically connected to the controller, and the flow rate of the fuel off-gas discharged to the outside and the flow rate of the discharged water (liquid water) may be controlled by controlling the opening and closing of the gas and water discharge valve by the controller. By controlling the opening degree of the gas and water discharge valve, the pressure of the fuel gas supplied to the anode of the fuel cell (anode pressure) may be controlled.

The fuel off-gas may contain the fuel gas that has passed through the anode without reacting, and the water generated at the cathode and delivered to the anode. In some cases, the fuel off-gas contains corroded substances generated in the catalyst layer, the electrolyte membrane or the like, and the oxidant gas or the like allowed to be supplied to the anode during a purge.

The circulation flow path may connect the fuel gas outlet of the fuel cell and the ejector.

The circulation flow path may branch from the fuel off-gas discharge flow path and connect to the ejector disposed in the fuel gas supply flow path, thereby merging with the fuel gas supply flow path.

The circulation flow path may branch from the fuel off-gas discharge flow path through the gas-liquid separator and connect to the ejector disposed in the fuel gas supply flow path, thereby merging with the fuel gas supply flow path.

The circulation flow path allows the fuel off-gas, which is the fuel gas discharged from the fuel gas outlet of the fuel cell, to be recovered and supplied to the fuel cell as the circulation gas.

A gas circulation pump may be disposed in the circulation flow path. The gas circulation pump circulates the fuel off-gas as the circulation gas. The gas circulation pump may be electrically connected to the controller, and the flow rate of the circulation gas may be controlled by controlling ON/OFF, rotational speed, etc., of the gas circulation pump by the controller.

The gas-liquid separator (anode gas-liquid separator) may be disposed in the circulation flow path.

The gas-liquid separator may be disposed at the branch point of the fuel off-gas discharge flow path and the circulation flow path. Accordingly, the flow path from the fuel gas outlet to the gas-liquid separator may be the fuel off-gas discharge flow path or the circulation flow path.

The gas-liquid separator is disposed upstream from the gas and water discharge valve of the fuel off-gas discharge flow path.

The gas-liquid separator separates the water (liquid water) and the fuel off-gas which is the fuel gas discharged from the fuel gas outlet. Accordingly, the fuel off-gas may be returned to the circulation flow path as the circulation gas, or unnecessary gas, water and the like may be discharged to the outside by opening the gas and water discharge valve of the fuel off-gas discharge flow path. In addition, the gas-liquid separator can suppress the flow of excess water into the circulation flow path. Accordingly, the occurrence of freezing of the circulation pump or the like due to the water, can be suppressed.

The controller physically includes a processing unit such as a central processing unit (CPU), a memory device such as a read-only memory (ROM) and a random access memory (RAM), and an input-output interface. The ROM is used to store a control program, control data and so on to be processed by the CPU, and the RAM is mainly used as various workspaces for control processing. The controller may be a control device such as an electronic control unit (ECU).

The controller may be electrically connected to an ignition switch which may be mounted in the vehicle. The controller may be operable by an external power source even if the ignition switch is turned OFF.

The controller has the data group showing the correlation between the current of the fuel cell and the temperature of the fuel cell which is necessary to keep the moisture content of the electrolyte membrane at the predetermined moisture content threshold or more.

For example, the predetermined moisture content (humidity) threshold may be 40% RH or more, or it may be appropriately set according to the performance of the fuel cell.

FIG. 4 is a diagram of an example of the power generation map (the data group) showing the correlation between the current of the fuel cell and the temperature of the fuel cell when the temperature of the fuel cell in a high temperature state drops, which is necessary to keep the moisture content of the electrolyte membrane at the predetermined moisture content threshold or more, which is effective in suppressing the deterioration of the electrolyte membrane.

In the present disclosure, deterioration of the electrolyte membrane is suppressed by selecting, when the temperature of the fuel cell decreases from high temperature to low temperature, an appropriate load at each fuel cell temperature as shown in FIG. 4 (the range indicated by 1).

As the data group, the power generation map as shown in FIG. 4 may be prepared in advance.

When the temperature and voltage of the fuel cell become the predetermined first temperature threshold or more and the predetermined voltage threshold or more, respectively, the controller conducts the temperature dropping time power generation mode in which power generation is conducted while controlling the current of the fuel cell with reference to the data group, until the temperature of the fuel cell becomes the predetermined second temperature threshold which is lower than the first temperature threshold.

For example, the predetermined first temperature threshold may be 85° C. or more, or it may be appropriately set according to the performance of the fuel cell.

For example, the predetermined voltage threshold may be 0.85 V or more, or it may be appropriately set according to the performance of the fuel cell.

For example, the predetermined second temperature threshold may be 75° C. or less, or it may be appropriately set according to the performance of the fuel cell.

The fuel cell system may include a battery.

The battery (secondary cell) may be any chargeable and dischargeable battery. For example, it may be a conventionally-known secondary cell such as a nickel-hydrogen secondary cell and a lithium ion secondary cell. The secondary cell may include a power storage element such as an electric double layer capacitor. The secondary cell may have a structure such that a plurality of secondary cells are connected in series. The secondary cell supplies power to the air compressor and the like. The secondary cell may be chargeable by a power source outside the vehicle, such as a household power supply. The secondary cell may be charged by the output power of the fuel cell. The charge and discharge of the secondary cell may be controlled by the controller.

The fuel cell system may include the state of charge (SOC) acquirer.

The SOC acquirer acquires the SOC of the battery.

The SOC acquirer is electrically connected to the controller. The controller detects the SOC of the battery acquired by the SOC acquirer.

As the SOC acquirer, a conventionally-known SOC sensor, a voltmeter or the like may be used.

The state of charge (SOC) means the percentage of the charge capacity with respect to the full charge capacity of the battery. The full charge capacity is a SOC of 100%.

For example, the SOC may be estimated from the open circuit voltage (OCV) of the battery.

When the temperature dropping time power generation mode is executed and when the SOC of the battery is less than the predetermined SOC threshold, the controller may charge the battery by the power of the fuel cell until the SOC of the battery becomes the SOC threshold or more.

An example of the temperature dropping time power generation mode executed by the controller is as follows. For example, when the temperature of the fuel cell is increased to the first temperature threshold (a high temperature determination threshold (e.g., 85° C.)) or more and the voltage of the fuel cell is increased to the voltage threshold (a high voltage determination threshold (e.g., 0.85 V)) by high output operation of the fuel cell, the temperature of the fuel cell may be decreased while the power generation of the fuel cell is continued so that, according to the operation temperature, the minimum humidity (the moisture content threshold) of the electrolyte membrane is kept at a certain level or more (for example, the minimum humidity of the electrolyte membrane is RH 40% or more) until the operation temperature becomes the third temperature threshold (the specified value (e.g., 75° C.)) or less.

The temperature dropping time power generation mode is executed after the high output operation. Accordingly, while continuing the power generation of the fuel cell, the battery suffering a decrease in SOC (state of charge) may be charged by the power generated by the fuel cell. In this case, the generated power is not wasted, and an impact on fuel efficiency is reduced, accordingly.

EXAMPLES

Example 1

Figures 5, 6:
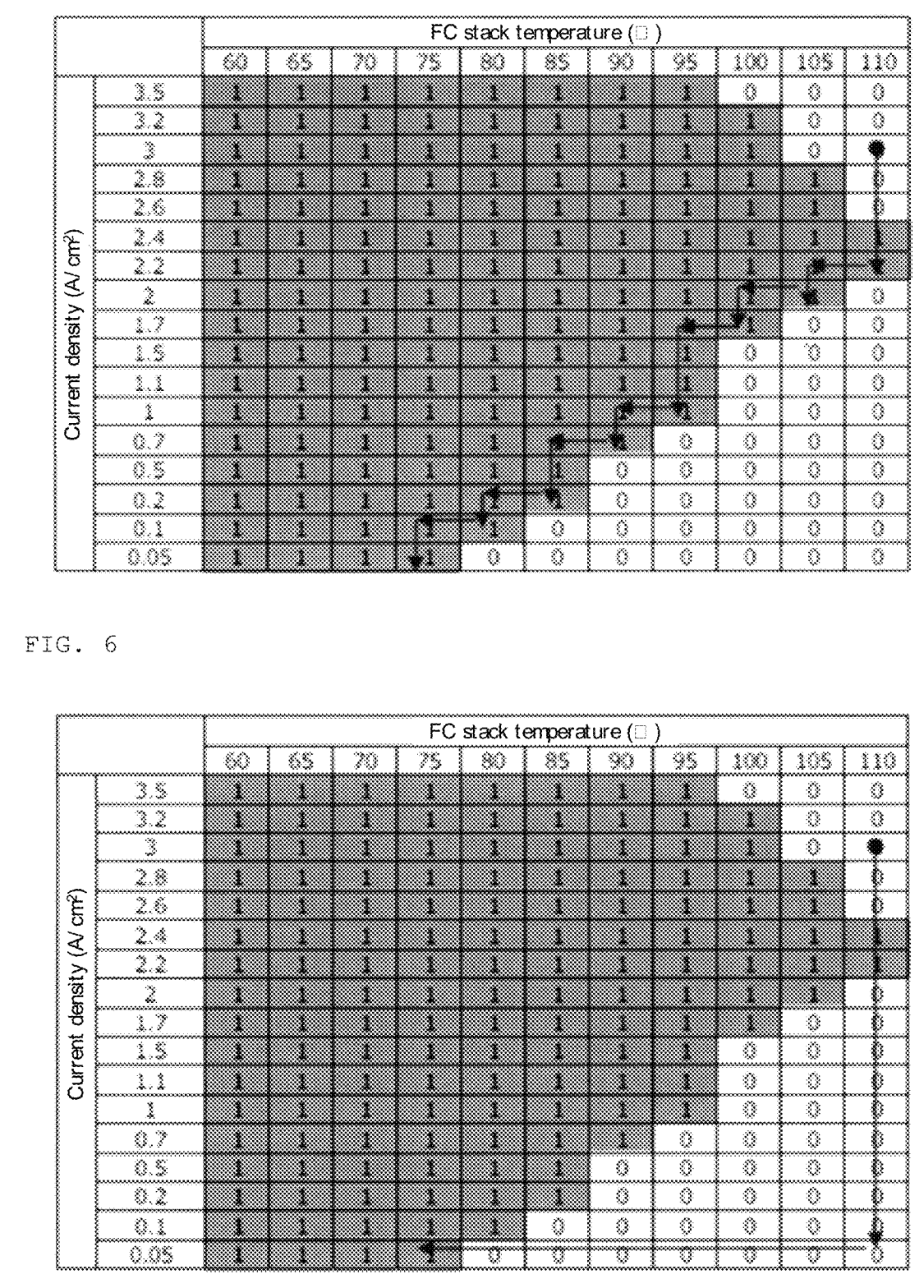

FIG. 5 is a diagram of an example of the transition of the temperature and the current during the temperature dropping time power generation mode of the present disclosure, in light of the power generation map shown in FIG. 4.

When the temperature and current density of the fuel cell stack became 110° C. and 3.0 A/cm$^2$, respectively, the temperature of the fuel cell stack was decreased to 75° C. by controlling the current density as indicated by the arrows shown in FIG. 5.

In Example 1, on the assumption that a request for power generation of the fuel cell is not made by a vehicle, an operation method with the minimum power generation amount was selected. When a request for power generation of the fuel cell is made by the vehicle, the fuel cell may appropriately generate power at a necessary current amount.

Comparative Example 1

FIG. 6 is a diagram of an example of the transition of the temperature and the current when the temperature dropping time power generation mode of the present disclosure is not executed, in light of the power generation map shown in FIG. 4.

When the temperature and current density of the fuel cell stack became 110° C. and 3.0 A/cm$^2$, respectively, the temperature of the fuel cell stack was decreased to 75° C. by rapidly decreasing the current density as indicated by the arrows shown in FIG. 6.

Figure 7:
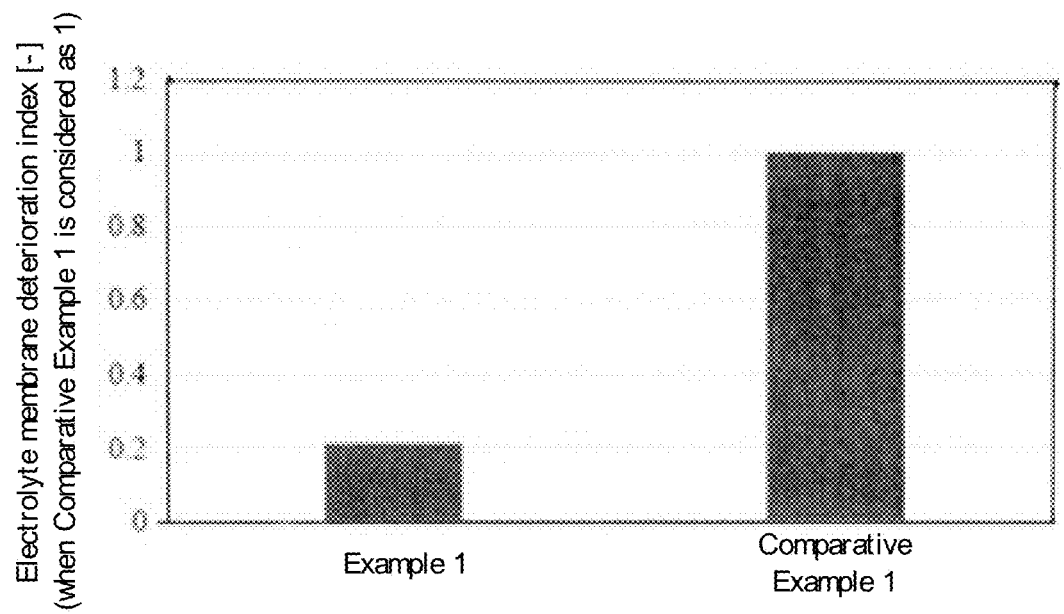
FIG. 7 is a diagram showing the electrolyte membrane deterioration index value of Example 1 when the electrolyte membrane deterioration index value of Comparative Example 1 is considered as 1.

FIG. 7 is a diagram showing the electrolyte membrane deterioration index value of Example 1 when the electrolyte membrane deterioration index value of Comparative Example 1 is considered as 1.

As shown in FIG. 7, compared to Comparative Example 1, electrolyte deterioration suppression of 79% is expected in Example 1.

The invention claimed is:

1. A fuel cell system,
    wherein the fuel cell system comprises:
    a fuel cell,
    a cooling system configured to cool down the fuel cell,
    a voltage acquirer configured to acquire a voltage of the fuel cell,
    a current acquirer configured to acquire a current of the fuel cell,
    a temperature acquirer configured to acquire a temperature of the fuel cell, and
    a controller;
    wherein the fuel cell comprises an electrolyte membrane;
    wherein the electrolyte membrane is a perfluorosulfonic acid (PFSA) membrane;
    wherein the controller has a data group showing a correlation between the current of the fuel cell and the temperature of the fuel cell which is necessary to keep a moisture content of the electrolyte membrane at a predetermined moisture content threshold or more; and
    wherein, when the temperature and voltage of the fuel cell become a predetermined first temperature threshold or more and a predetermined voltage threshold or more, respectively, the controller conducts a temperature dropping time power generation mode in which power generation is conducted while controlling the current of the fuel cell with reference to the data group, until the temperature of the fuel cell becomes a predetermined second temperature threshold which is lower than the predetermined first temperature threshold.

2. The fuel cell system according to claim 1,
    wherein the fuel cell system further comprises a battery and a state of charge (SOC) acquirer configured to acquire an SOC of the battery, and
    wherein, when the temperature dropping time power generation mode is executed and when the SOC of the battery is less than a predetermined SOC threshold, the controller charges the battery by power from the fuel cell until the SOC of the battery becomes the predetermined SOC threshold or more.

* * * * *